United States Patent [19]

Egner

[11] 3,942,406
[45] Mar. 9, 1976

[54] SLAB-SIDED SELF-TAPPING SCREW
[75] Inventor: Ronald J. Egner, Birmingham, Mich.
[73] Assignee: Textron Inc., Providence, R.I.
[22] Filed: Oct. 7, 1974
[21] Appl. No.: 512,541

[52] U.S. Cl. ................................. 85/47; 10/152 T
[51] Int. Cl.² ........................................ F16B 33/02
[58] Field of Search .......... 85/47, 41, 1 L; 10/10 R, 10/152 T

[56] References Cited
UNITED STATES PATENTS

| | | | |
|---|---|---|---|
| 2,347,360 | 4/1944 | Muenchinger | 85/47 |
| 2,350,346 | 6/1944 | Gaskell | 85/47 |
| 2,703,419 | 3/1955 | Barth | 10/152 T |
| 3,492,908 | 2/1970 | Thurston | 85/47 |

*Primary Examiner*—Ramon S. Britts
*Attorney, Agent, or Firm*—Olson, Trexler, Wolters, Bushnell & Fosse, Ltd.

[57] ABSTRACT

A self-tapping fastener and method of manufacture wherein said fastener is provided with a unique tapping section, in addition to a driving head and an intermediate threaded portion of generally conventional design. The tapping section is defined by a plurality of interrupted thread turns of an asymmetrical configuration. Each turn includes a pair of diametrically opposed lobe portions, with a pair of opposed side portions disposed intermediate said lobes. One said side portion is defined by a complete absence or void of material provided by a gap of controlled dimensions, while the other is provided by a thread form of an incomplete or under-filled configuration. The fastener of the invention is fabricated by rolling a specially designed blank between a pair of standard thread rolling dies.

1 Claim, 12 Drawing Figures

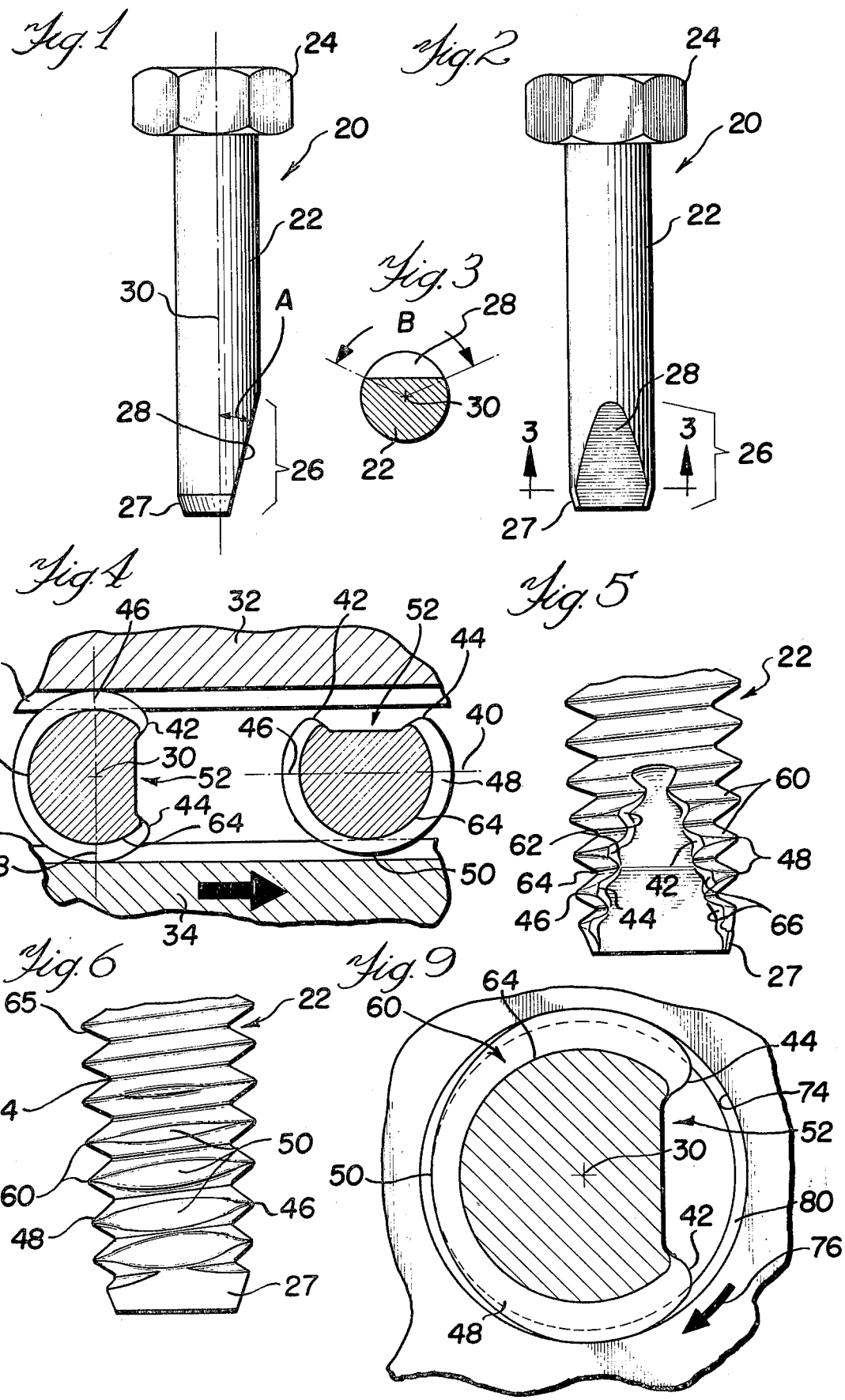

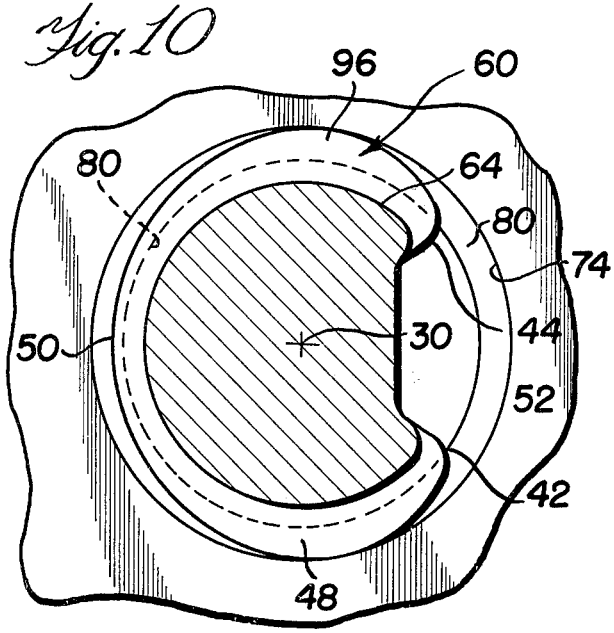
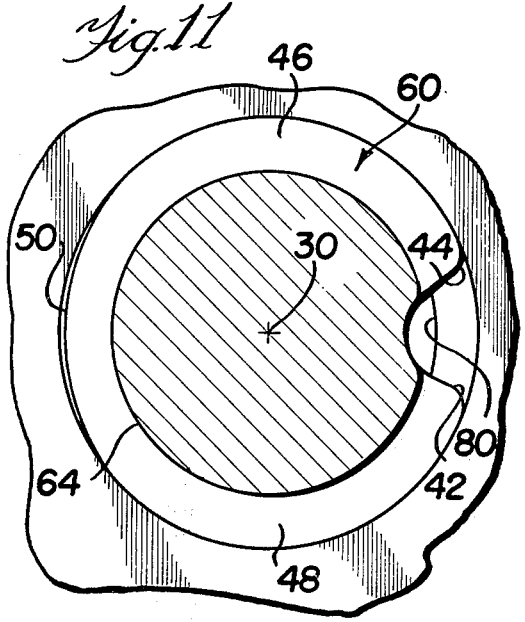
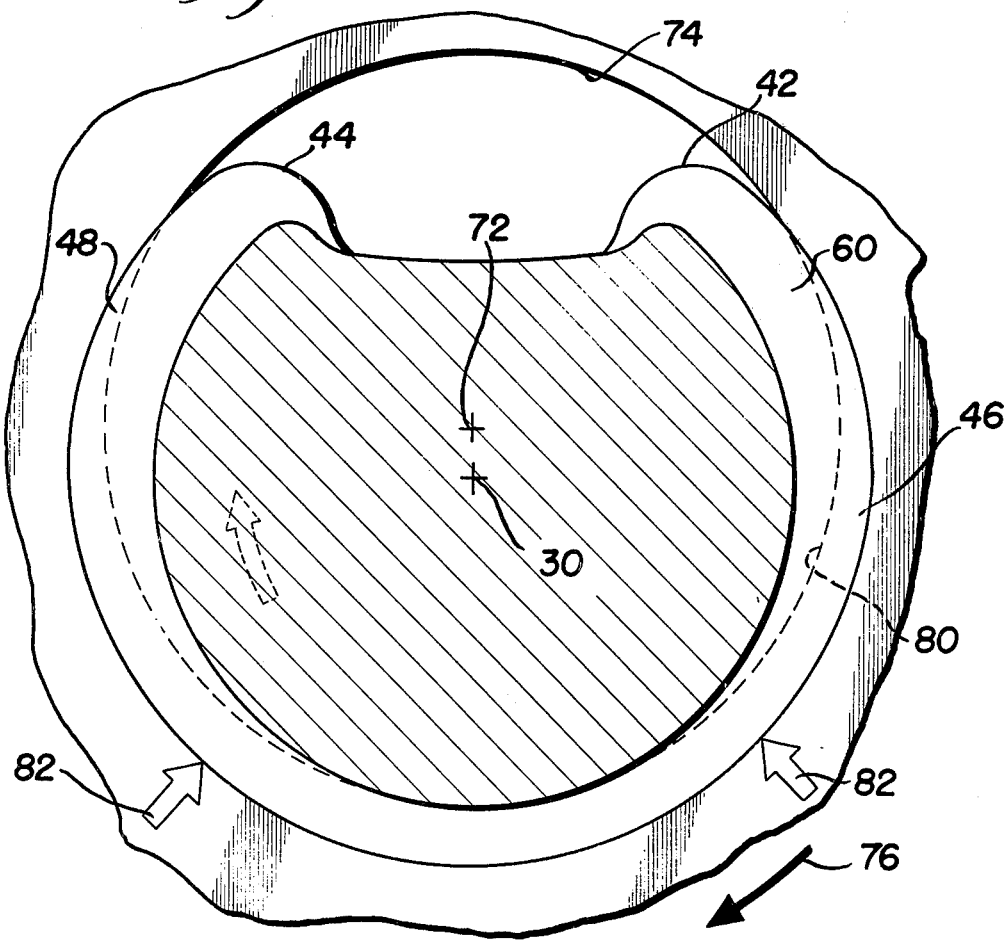

3,942,406

SLAB-SIDED SELF-TAPPING SCREW

BACKGROUND OF THE INVENTION

Present invention relates to self-tapping fasteners, and more particularly to a novel fastener design employing but two thread-forming lobe portions and providing increased radial relief thereby reducing the driving torque required to engage said fastener in a pilot aperture.

There are available numerous forms or types of self-tapping fasteners, such as illustrated in U.S. Pat. Nos. 3,681,963 and 3,218,905. While these fasteners have filled a prior commercial need for self-tapping devices, and have met with a great degree of commercial success, these fasteners are not without their problems or disadvantages, and there exists considerable room for improvement. For example, certain of these prior art fasteners have proved relatively expensive to manufacture; the driving torque required in fully seating the fastener is relatively high, thus necessitating expensive driving tools. Still an additional problem encountered with the prior art design is that of effecting the initial thread-forming engagement with the wall surface of the pilot aperture.

The present invention overcomes a number of these problems, and obviates, to a great extent, other of the problems inherent with the prior art devices. With the present invention, the thread-forming portion on the fastener, i.e., the generally tapered portion adjacent the work entering end, is provided with a specific type of thread form that facilitates initial engagement and materially reduces the driving torque required, without sacrificing quality in the female thread thus formed. In this regard, each thread turn includes but one pair of diametrically opposed lobes which effect cold working of the pilot aperture wall surface. Intermediate these lobes are provided a pair of asymmetrical side portions having a crest height less than the maximum crest height of the lobe portions in a particular thread turn. One of the aforementioned side portions is defined by a controlled gap or void in the thread form, viz., a complete absence of material. The thread turns rearwardly of the thread forming portion are preferably of a conventional design. The radial extent of said controlled gaps decreases in a direction away from said work entering end toward the driving head. As such, the overall cross-sectional area of the tapered, work entering end is reduced, thus facilitating initially engagement of the fastener in the pilot aperture.

The above-discussed thread construction also provides increased radial relief, as compared with the prior art designs, and correspondingly a reduction in the required driving torque for comparable size fasteners. Furthermore, as discussed above and as will be more apparent from the following discussion, this increased radial relief is achieved without sacrificing ease of initial engagement of the fastener in the pilot aperture, or the quality of the female thread formed in the wall of the pilot aperture.

The degree or extent of the gap provided in the thread configuration of the present invention is controlled, such that while the angular extent of the gap increases toward the work entering end of the fastener, the included angle defined by the extremities of the gap is always less than 180°. This feature, as will be explained hereinafter, enables the thread configuration to include a pair of opposed edge portions that are of a crest height less than that of the lobe portion of the particular thread turn. The fact that the height of the edges is controlled in this manner enables the female thread to be formed by cold working of the wall material, rather than by a cutting or metal removal process. More explicitly, maintaining of the discontinuity in the thread turn at less than 180° is achieved by controlling the shape of the blank from which the fastener is rolled. In this regard, a generally circular blank is provided with a slabbed or flattened portion disposed proximate the work entering end and disposed at an angle with respect to the blank axis. The disposition of said plane is controlled, such that a plane containing said flattened portion will not intersect the blank axis short of the work entering end. Thus, any section taken through the blank in the vicinity of the flattened portion would include a flat portion having an angular extent of less than 180°.

Thus, when a thread is formed on said blank by a thread-rolling process, there is always sufficient material to produce the above-discussed diametrically opposed lobes, and the thread edges of less height than said lobes, on all thread turns. Such would not be the case, if the flattened portion extended for more than 180°. Assuming a situation wherein the gap extends for more than 180°, the thread edges produced would be in the area of the lobes and would be of a relatively sharp nature such that they would engage and bite into the surface of the pilot aperture, acting essentially as cutting edges, and effecting metal removal in the formation of the female thread. By controlling the angular extent of the discontinuity, it is assured that any edges thus produced are of a rounded configuration having a height less than the lobe portion so that only cold working of the aperture wall is employed in the formation of the internal, female thread.

DESCRIPTION OF THE DRAWINGS

With the above in mind, attention is now directed to the drawings wherein:

FIG. 1 is an elevational view of a blank of the type employed in fabrication of the present invention;

FIG. 2 is an elevational view similar to FIG. 1, with the blank rotated 90°;

FIG. 3 is a sectional view through the blank of FIG. 2, taken along the line 3—3;

FIG. 4 is a schematic view illustrating the conditions existing during rolling of the blank of FIGS. 1–3 between a pair of opposed parallel thread-forming dies;

FIG. 5 is a partial elevational view of the work entering end of the fastener resulting from the blank of FIGS. 1–3 being rolled as illustrated in FIG. 4;

FIG. 6 is a partial elevational view of the fastener of FIG. 5 rotated 180°;

FIGS. 9, 10 and 11 are sectional views taken along the corresponding lines of FIG. 8; and FIG. 12 is a sectional view similar to FIG. 9, but on an enlarged scale, and illustrating the forces created during engagement of the fastener of the present invention with a pilot aperture.

DESCRIPTION OF THE ILLUSTRATED EMBODIMENT

Figure 7:
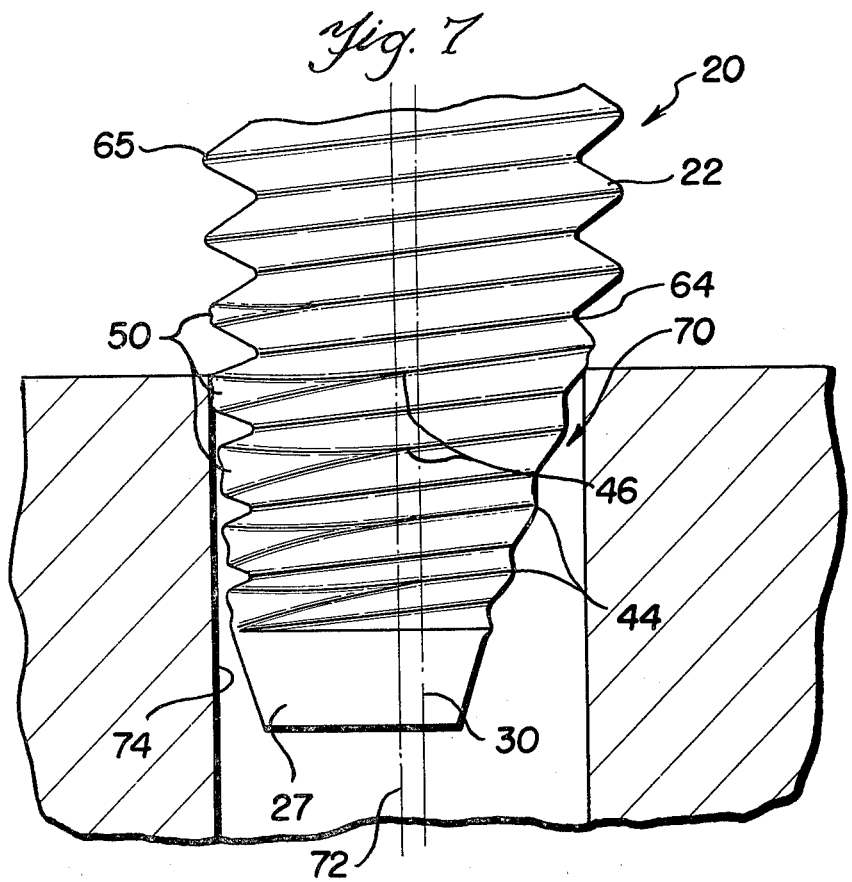
FIG. 7 is a partial sectional view illustrating the condition upon initial engagement of the fastener of the present invention with the pilot aperture.

While a detailed discussion of the novel fastener design and method of fabricating, which make up the present invention follows hereinafter, the above discussion of the prior art and the general overall structural and operational features of the present invention are incorporated herein by reference. More specifically, in FIGS. 1–4, the method of fabricating the fastener of the present invention is illustrated; FIGS. 5 and 6 show basically the general overall configuration of the thread-forming portion of the fastener; and FIGS. 7–12 illustrate, in a somewhat schematic manner, the conditions existing during the various stages of engagement of the fastener of the present invention in a pilot aperture.

Attention is first directed to FIGS. 1–4, and most specifically FIGS. 1 and 2 where a blank of the type employed in constructing the fastener of the present invention is shown. The blank is designated generally 20 and includes a substantially circular elongated shank portion 22 with a driving head 24 formed at one end thereof. The opposite end of the blank, designated generally 26 includes a slightly tapered portion 27 and will, upon completion of the threadforming process, provide the work entering end of the fastener. It should be noted that the hex-type driving head illustrated is but one type of the various drive arrangements that may be employed with the present invention.

While the shank portion 22 was described above as being generally circular, it should be noted that a segment adjacent the work entering end 27 has in effect been removed to provide a flattened surface 28. The flattened surface 28 is preferably planar, but may be slightly concave or convex, if desired. Regardless of the degree of flatness of the surface 28, said surface is disposed generally at an angle (designated A) with respect to the axis 30 of the blank, FIG. 1. This angle A is selected, such that a plane containing the surface 28 does not intersect the axis 30 along the length of the shank. Or, to phrase it differently, a plane containing the surface 28 will only intersect axis 30 at some point beyond the work entering end portion 27.

The blank 20 may be formed initially with the entire shank portion 22 circular in cross-section and a segment thereafter removed to form the substantially planar surface 28. Preferably, the flattened or planar surface 28 and the illustrated tapered end portion 27 are formed by an extrusion process in conjunction with the upsetting operation employed to form the driving head 24.

By controlling the angle of inclination A of surface 28 relative to the axis 30 it can be assured that intersection of this surface with the axis 30 does not occur. Control of the angle A produces an additional, important result, namely, it also insures that angular extent of the flattened surface is maintained at a value less than 180°. In this regard, attention is directed to FIG. 3, a sectional view through the end portion 26. The angle B defines the angular extent of surface 28, and is always less than 180°.

To form the threaded portion on the blank 20, said blank is disposed between a pair of thread rolling dies 32 and 34 of generally standard design. In this regard, the dies are designed to perform an upsetting operation on the blank 20 thereby cold forming an external or male-type thread thereon. One of the dies, 34 as illustrated, is movable relative to the other thereby producing relative rotation of the blank 20 causing said blank to move along the length of the dies and thereby producing a helically disposed thread formation or pattern thereon. It should be noted that in FIG. 4 the fastener blank 20 is viewed looking from the driving head toward the work entering end. The distinction is important, as the numerous sectional views of FIGS. 9–12 are taken in an opposite direction, that is looking from the work entering end toward the driving head. It should also be kept in mind that FIG. 4 is of a generally schematic, illustrative nature, the dies 32 and 34 being representative of the various known thread-rolling methods that could be employed.

The rolling of threads on a blank is well-known in the fastener art and only brief detail will be set forth herein as to the general concept, with particular attention being directed to what transpires with regard to the configuration of the thread formed on section 26 of the blank 20. The thread formed on the cylindrical surface of portion 22 of blank 20 will be of conventional design, i.e. fully formed and generally circular in section.

Briefly, during the rolling operation, the material of blank 20 is upset and cold worked to produce the helical thread configuration. That is to say, essentially no metal is removed, but only a re-working of the existing metal takes place, the final crest diameter of the fully formed fastener being greater than the original diameter of the blank 20. The configuration of the thread formed upon the relatively circular portion of the blank will be of a conventional nature. As will be explained, the thread configuration achieved approximate the work entering end 27 of the blank 20 will be of a lobular form, due to the employment of the planar portion 28. For purposes of discussion, the blank in either its threaded or unthreaded state will be designated by the reference character 20. In a similar manner reference characters 22, 26 and 27 are used to designate the threaded portions of the blank.

During rolling with the parellel dies 32 and 34, one of said dies is moved, while the other is maintained stationary. As such, the blank 20 is rolled between the opposed die and moves longitudinally thereof from one end to the other. During this movement, the spacing between dies 32 and 34 is maintained at a selected, preset distance, with the thread-forming grooves 36 on said dies, cold working the exterior surface of the blank 20 into the form of a helical thread.

Considering first the circular portion 22 of blank 20, as this portion is of a generally uniform configuration, the engagement or pressure exerted by the grooves 36 will be constant throughout the thread-rolling operation, thereby producing a uniform, standard thread configuration. Also, due to the generally symmetrical nature of the blank portion 22, the path of movement of the axis 30 during rolling will be substantially a straight line, there being essentially no wobbling of the blank 20.

The portion of the blank containing the planar surface 28 is of a generally asymmetrical configuration with respect of the axis 30. Thus, equal pressure will not be applied to the portion 26 during the rolling operation, with FIG. 4 illustrating generally, what transpires during rolling of the blank portion 26. For purposes of illustration, a reference or datum line 40 is employed. In the condition illustrated in the right hand portion of FIG. 4, said datum line 40 is disposed generally parallel to the cross-sectional projection of surface 28 and perpendicular to the opposed surfaces of dies 32 and 34. Keeping in mind that what is being dealt with here is a cold working operation, when the blank 20 is in the position wherein the datum line 40 is perpendicular to the die surfaces, sufficient blank material is available and presented to the thread-forming grooves 36 such that a complete thread profile will be attained coincident with said datum line 40. The crest height of the thread thus formed decreases about the periphery of the blank 20 in a direction away from the datum line 40. In this regard, it should be noted that the blank material extends to the bottom of the thread forming groove 36, which defines the thread profile on the fastener, with the exterior or land portion of said groove forming the root of the fastener thread.

As the blank 20 continues to rotate, it will move toward the condition as illustrated in the left hand portion of FIG. 4 with datum line 40 moving approximately 90° to a position disposed generally parallel to the die surfaces. In the illustrated condition, due to the fact that the flat surface 28 is now brought into position opposite an associated groove 36, insufficient blank material is presented to said groove, such that a complete thread profile cannot be formed. In point of fact, little if any engagement will be obtained proximate the planar surface 28 which results in the production of a gap or void in the thread form. This factor also affects the degree of engagement of the opposed die member. In this regard, it will be recalled that due to the engagement of the dies 32 and 34 with the circular portion 22 of blank 20 and the fixed spacing of said dies, the blank 20 will not wobble during rolling. Accordingly, with regard to the portion of the blank opposite the planar portion 28, the absence of wobbling taken in conjunction with the absence of material produced by said planar portion 28 results in an insufficiency in forming pressure. Thus the groove 36 is not filled opposite surface 28 thus resulting in an incomplete or underfilled thread profile at the locations diametrically opposed to said surface 28. In addition, as the material is cold worked toward the planar surface 28, a pair of spaced abrupt edges will be formed which define the discontinuity in the thread configuration, said edges being designated generally 42 and 44, respectively.

It is to be kept in mind, that with the condition illustrated in the left hand portion of FIG. 4, the dies cannot move toward each other, due to the presetting of their spacing, and the engagement of said dies with the circular portion 22 of the blank. Thus, while there may be some bending of the end portion 26 the blank axis 30 will move generally in a straight line. As mentioned above the absence of material produced by employment of the planar surface 28 is reflected in the thread form disposed oppositely thereof, in that said thread will be of an incomplete or underfilled profile.

The thread configuration thus produced with the above-discussed method is such that a pair of diametrically opposed lobular portions 46 and 48 result, the lobular portions being generally coincident with the datum line 40 and having their maximum crest height at a point along said datum line. The side portions of the thread form produced with the described method are designated generally 50 and 52, and are of a lesser crest height than the lobular portions 46 and 48. These side portions are disposed on opposite sides of the datum line 40. The side portions 50 and 52, as will be discussed in further detail, are of a generally asymmetrical configuration.

The thread form produced pursuant to the rolling of the blank portion 26 is best viewed and understood with reference to FIGS. 5 and 6. Looking first to FIG. 5, it can be seen that the thread form, designated 60 on the end portion 26, includes a plurality of gaps 62 of controlled dimension. The gaps 62 decrease in extent in a direction away from the work entering end 27, and define the side portion 52 as referred to previously. In FIG. 6, which is a view similar to FIG. 5 but rotated 180°, it can be seen that the opposite side portions 50 are in the form of incomplete thread formations, referred to in the art as underfilled threads. The degree or extent of the underfilling also decreases in a direction away from the work entering end of the fastener.

Returning now to FIG. 4, it should be noted that the root of the thread formation produced with the above-discussed method, and designated generally 64, is of a circular configuration. As such, the thread height (which is defined as the distance from the root to the crest of the thread) will be maximum along the datum line 40 for the lobe portions 46 and 48, with the maximum thread height at the edges 42 and 44 being a value less than that for the lobes 46 and 48.

Attention is now directed to FIGS. 7–12 which illustrate the conditions existing upon engagement of the threaded blank or fastener 20 in a pilot aperture 70. With reference to FIG. 7, there is illustrated the initial condition, wherein the fastener is first engaged with a pilot aperture 70 having a center line 72. Due to the extent of the gaps 62 in the threads immediately adjacent the work entering end 26, which produces the overall asymmetrical configuration, a considerable segment of said threaded end 26 will be disposed in the aperture 70. However, it should be noted that the fastener 20 will be offset with respect to said pilot aperture, i.e., the center line 30 of said fastener being displaced with respect to the center line 72 of said aperture. This displacement results in a number of the interrupted thread turns 60 being disposed within the aperture and in engagement with surface wall 74 thereof. Accordingly, with the fastener 20 initially disposed in the aperture 70 as shown in FIG. 7, and assuming rotation thereof coupled with the application of an axially directed force, the interrupted thread turns 60 will have purchase with the wall surface 74. This engagement will result in the interrupted thread turns 60 gripping or cold working the wall surface 74 thereby pulling the fastener 20 interiorly with said aperture 70. The above-mentioned cold working continues, and increases in degree as the fastener 20 moves inwardly of aperture 70, and results in the formation of an internal thread configuration; the fastener 20 ultimately arriving at the intermediate condition illustrated in FIG. 8.

Figure 8:
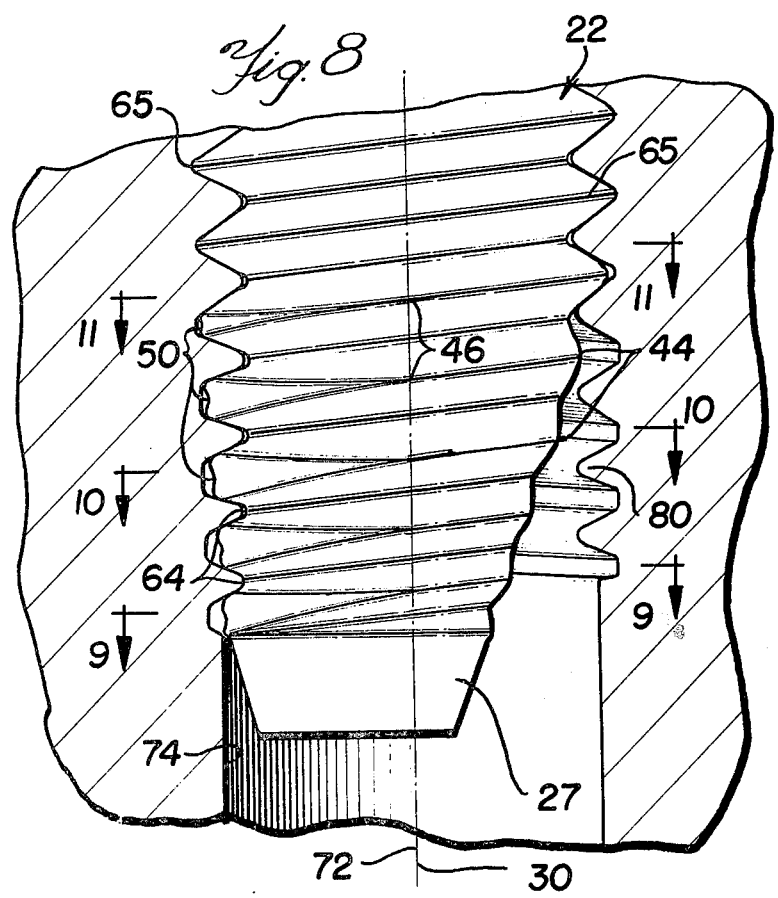
FIG. 8 is a view similar to FIG. 7 with the fastener engaged with said pilot aperture in thread-forming relationship.

It should be noted that in FIG. 8, the fastener 20, although not fully engaged within the aperture 70, has moved to a coaxial position, viz., axis 30 of the fastener and axis 72 of the aperture coincide. The forces which result in this movement will be discussed hereinafter with regard to FIG. 12. It should be noted, however, that continued driving of the fastener from the position as illustrated in FIG. 8 will result in the entire aperture wall being cold worked to form an internal thread and will bring the generally circular thread portion 22 of the fastener into engagement with the internal threads thus formed.

It should be noted that the interrupted threads 60 on the end portion 26 are possessed of a generally tapered configuration, in that the maximum crest diameter of the lobe portions increases in a direction away from the work entering end. This results due to the decrease in the extent of the gaps 62, and correspondingly an increase in the amount of material available for the formation of a thread profile in the areas removed from the work entering end 27. As such, the material of the wall surface 74 of aperture 70 will be cold worked in a progressive manner to produce the desired internal thread configuration. The thread configuration on the shank 22 positioned beyond the interrupted threads 60 are designated generally 65 and, as discussed above, are of a standard, circular configuration. These threads will have a maximum thread height which is approximately equal that of the last lobe portion 46 or 48 on the self-tapping section 26 so as to have full engagement with the internal thread formed by the self-tapping portion 26 and thereby resist inadvertent withdrawal of the fastener.

The conditions of engagement at various locations along the tapered, self-tapping portion 26 once the fastener has reached the coaxial disposition in the aperture 70 are illustrated in FIGS. 9-11. In this regard, it must be kept in mind that the illustrations are of a somewhat schematic nature, in that the thread profile is not planar as illustrated, but is disposed about a helix. Therefore, with specific reference to FIG. 9, for example, the overall dimension from the center line 30 to the lobe portion 48 will be slightly greater than that to the lobe portion 46, due to the aforementioned tapered configuration. Of course, the thread height of the lobes 46 and 48 on the thread turns of FIGS. 10 and 11 will have an overall radial height greater than those of FIG. 9. It is this gradual progression in the overall radial thread height of the lobe portions 46 and 48 which produce the gradual, yet effective cold working of the aperture wall 74 to produce the internal thread 80.

Referring specifically to FIG. 9, there is shown a condition of engagement relatively adjacent the work entering end 27 of the fastener 20. In this regard, it should be noted that the side portion 52 defined by the gaps 62 is maximum. Correspondingly, the degree or extent of the underfill of the thread form on the opposed side surface 50 of this thread turn is also at a maximum. Thus, there results a considerable amount of radial relief at this location with only the relative tips of the lobe portions 46 and 48 being brought into engagement with the aperture wall 74.

Fastener 20 will be rotated in a direction indicated by the arrow 76. It should be noted that FIG. 9, as well as FIGS. 10-12, are sectional views taken in a direction looking from the work entering end 27 toward the driving head 24 of the fastener 20. Accordingly, the edge 44 of the thread form 60 will in effect be the leading edge, with the edge 42 the trailing or following edge of the thread turn illustrated. Also of importance here, is the fact that the maximum cross-sectional diameter of the tapping portion 26 in the area of FIGS. 9-11 will be through the lobe portions 46 and 48. Keeping in mind here again the fact that the thread form is disposed on a helix, the overall radial height of the lobe 48 in each instance will be slightly greater than that of the lobe 46. With the maximum value of the overall height of the lobes increasing along the length of the externally threaded self-tapping portion 26 until the circular thread 65 is reached, whereupon the radial height of the threads on fastener 20 remain substantially constant.

In FIGS. 10 and 11, it can be seen that the extent of the gaps 62 in the thread form 60 has been decreased, and correspondingly, the degree of underfill of the opposed side portion 50 is also less. Thus, the extent of radial relief at the location of FIGS. 10 and 11 is diminished from that of FIG. 9 with the form of the thread gradually becoming circular upon entry into the threaded portion 64, wherein little or no radial relief is provided.

The importance of radial relief in a self-tapping thread configuration cannot be overstressed. As mentioned above, the tapping or forming of a female thread is a cold working operation requiring that the metal of the pilot aperture be swaged and then reformed into an internal thread configuration. This operation, of necessity, requires physical movement of the metal about the inner periphery of the pilot aperture. Thus, if the forming or male thread is in engagement about 360°, there is no space into which the displaced material can move and galling will result. Where radial relief is provided, there exists areas or zones into which the displaced metal can move and subsequently be reshaped by the lobular portions 46 and 48 of the fastener. The greater the extent or amount of radial relief provided, the lower the driving torque required for the fastener.

Attention is now directed to FIG. 12 which illustrates essentially the condition existing shortly after initial thread forming engagement is achieved. In this regard, the female internal thread is designated generally 80, with the initial offset position of the fastener relative to the aperture being shown by the respective center lines 30 and 72. It must be kept in mind, that the illustration of FIG. 12 is that before coaxial positioning is achieved. Here again, it should be noted that the thread form illustrated will now be of a planar disposition, but will be more properly helical in nature.

Attention is now invited to both FIGS. 7 and 12 wherein the offset relationship can be viewed. Assuming rotation of the fastener 20 in a direction indicated by arrow 76 in FIG. 12, it will be noted that the lobe portion 46, to the right as viewed, is the leading lobe. As such, the degree of interference or engagement with the aperture side wall will initially be greater for the leading lobe, than it will be for the trailing lobe 48, disposed to the left as viewed. The difference in the degree of engagement will produce a force vector, indicated by the arrow 82 which will tend to move the center line 30 of the fastener toward the center line 72 of the aperture.

During the initial thread forming engagement, and thereafter upon the obtaining of coaxial engagement, the lobe portions will operate to produce a cold working of the aperture wall 74 to produce the internal thread 80. In view of the fact that the lobe portions 46 and 48 have a height greater than the height of the edges 42 and 44, these edges will not be brought into engagement with the material of the aperture wall and thus no cutting action results.

While there has been disclosed herein, a preferred embodiment of the invention, it is by no means intended that same shall define the full limits of the present invention. Applicant is well aware that those skilled in the art may readily devise various modifications, changes or alterations from the specific designs shown, which do not depart from the spirit and scope of the invention, as these are defined by the claims appended hereto.

The invention is claimed as follows:

1. A self-tapping fastener capable of forming a female thread in a pilot aperture, said fastener comprising: an elongate shank having driving means thereon, such that the end of said shank remote from said driving means constitutes the work entering end of said fastener; and a threaded portion formed on said shank extending from said work entering end toward said driving means, said threaded portion including a tapered thread-forming section proximate said work entering end, and a cylindrical portion having a circular thread formation disposed intermediate said thread-forming section and said driving means, said thread-forming section including a plurality of discontinuous rolled thread turns, characterized in that the crest formation of each thread turn includes a pair of generally diametrically disposed lobe portions, with diametrically spaced asymmetrical side portions disposed intermediate said lobes on each thread helix, said side portions having a thread height less than that of said lobe portions, and one of said side portions being defined by a single gap in the thread turn, while the other side portion is defined by an under-filled, incomplete thread crest formation, said gap producing a first, following thread edge and a second, leading thread edge spaced from said first edge along the thread helix, said leading thread edge being of an inwardly rounded configuration, the maximum angular extent of said gap in each thread turn being less than 180° such that the thread height at said first and second thread edges for each thread turn is less than the maximum thread height of the lobe portions of said turn, and the angular extent of said gap for the thread turns decreasing progressively in a direction away from the work entering end of said fastener.

* * * * *